United States Patent [19]

Ueyama et al.

[11] Patent Number: 4,880,905
[45] Date of Patent: Nov. 14, 1989

[54] PROCESS FOR PRODUCING ORGANOPHOSPHAZENE POLYMERS WITH CHLOROPHOSPHAZENE

[75] Inventors: Shinichiro Ueyama; Yasuhiro Yoshikawa; Tetsuhiko Okamoto, all of Tokyo, Japan

[73] Assignee: Nippon Soda Co., Ltd., Tokyo, Japan

[21] Appl. No.: 270,008

[22] Filed: Nov. 14, 1988

[30] Foreign Application Priority Data

Nov. 19, 1987 [JP] Japan ................................. 62-290712

[51] Int. Cl.$^4$ ...................... C08G 73/00; C08G 25/00
[52] U.S. Cl. ................................... 528/399; 528/167; 528/168; 528/398; 528/400; 525/538
[58] Field of Search ................ 525/538; 528/167, 168, 528/398, 399

[56] References Cited

U.S. PATENT DOCUMENTS 3,888,800  6/1975  Shibuta et al. ...................... 528/399
4,446,295  5/1984  Allcock ............................... 528/399

Primary Examiner—Harold D. Anderson
Assistant Examiner—T. Mosley
Attorney, Agent, or Firm—George B. Oujevolk

[57] ABSTRACT

Various kinds of organophosphazene polymers are produced by reacting dichlorophosphezene polymer with hydroxy compounds using a tertiary amine such as triethyl amine as an acid acceptor in the presence of pyridine derivative such as 4-dimethylaminopyridine as a catalyst under mild reaction conditions to substitute substantially all the chlorine atoms with organic groups.

7 Claims, No Drawings

PROCESS FOR PRODUCING ORGANOPHOSPHAZENE POLYMERS WITH CHLOROPHOSPHAZENE

BACKGROUND OF THE INVENTION

1. Field of the Invention

The present invention relates to a process for producing organo phosphazene polymers, for which many industrial applications have now been developed in various fields. Organophosphazene polymers have excellent properties such as heat-resistance, flame-resistance, and oil-resistance and can be useful as flame retardants, lubricant oils, electric insulators or hydraulic oils. Recently, medical applications have been also studied actively, such as sutures, artificial blood vessels and artificial internal organs owing to the innocuous properties of the organophosphaznen polymers and their metabolites to living body.

2. Description of the Prior Art

Cyclic chlorophosphazene trimer, especially, cyclic dichlorophosphazene trimer (hereinafter referred to as "3PNC") polymerizes to linear polymers at elevated temperatures. For the production of organophosphazene polymers, the chlorophosphazene polymers are reacted with organic hydroxy compounds to substitute the chlorine atoms bonded to the phosphorus atoms in the phosphazene skeleton (hereinafter referred to as "active chlorine atoms") with the hydroxy compounds. Various methods for producing organophosphazene polymers are illustrated in "Phosphorus Nitrogen Compounds", pp. 354–356, written by H. R. Allcock, Polymeric Materials: Science and Engineering, vol. 53, pp. 118–122, written by Austin and H. R. Allcock. These methods may be generally classified into the following three groups:

(1) the reaction of alkali metal salt of hydroxy compounds, (2) the reaction of hydroxy compounds using a tertiary amine as an acid acceptor, (3) the reaction of alkali metal salt of hydroxy compounds using a quaternary ammonium salt as an acid acceptor.

However, the method (1) described above takes an extremely long reaction time to completely replace all the active chlorine atoms. In the method (2) described above, it is generally difficult to replace all the active chlorine atoms entirely. The method (3) described above requires an expensive catalyst in a considerably great amount and a relatively long reaction time for the completion the reaction.

Further, since all the known reactions described above are conducted under heating, when introducing such substituents as unsaturated aliphatic groups which polymerize easily, it is inevitable to form by-products by polymerization.

On the other hand, the present inventors found a similar method to the present invention and filed a U.S. patent application Ser. No. 157,321 on Feb. 18, 1988. In the method, aryloxyphosphazene oligomers are produced by the substitution of chlorine atoms of chlorophosphazene oligomers such as 3PNC with aryloxy groups.

SUMMARY OF THE INVENTION

Accordingly, it is an object of the present invention to provide a process for producing organophosphazene polymers, in which replacement of the active chlorine atoms of chlorophosphazenen polymer with hydroxy compounds is accomplished under mild reaction conditions.

It is another object of the present invention to provide excellent catalysts for the substitution reaction of the active chlorine atoms with various hydroxy compounds.

It is another object to provide a process which is useful for producing various kinds of organophosphazene polymers.

These and other objects of the invention will become more apparent in the following detailed description.

DETAILED DESCRIPTION OF THE INVENTION

The present invention concerns a process for producing an organophosphazene polymer represented by the formula (I)

$$\text{---}[\text{N}=\text{P}(\text{OR})_2]_n\text{---} \qquad (I)$$

wherein R is the same or different group selected from the group consisting of alkyl, alkenyl, alkinyl and aryl group and said groups may have a substituent and n is an integer of 20 or more, which comprises reacting a chlorophosphazene polymer represented by the formula (II)

$$\text{---}[\text{N}=\text{PCl}_x(\text{OR})_y]_n\text{---} \qquad (II)$$

wherein n is an integer of 20 or more, x+y=2 and R is the same as defined above, with at least one kind of hydroxy compound represented by the formula (III)

$$\text{HO---R} \qquad (III)$$

wherein R is the same as defined above, to substitute substantially all the chlorine atoms of chlorophosphazene polymer with the organic groups.

The reaction is carried out using a tertiary amine represented by the formula (IV) as an acid acceptor

$$X^2\text{---}N\text{---}X^1 \atop \phantom{X^2---}X^3 \qquad (IV)$$

wherein $X^1$ represents alkyl, cycloalkyl or aralkyl, $X^2$ and $X^3$ represent identical or different lower alkyl or may constitute pyrrolidine, piperidine or morpholine ring together with the nitrogen in the presence of a pyridine derivative represented by the formula (V) as a catalyst

(IV)

wherein $Q^1$ and $Q^2$ represent identical or different lower alkyl groups or constitute a pyrrolidine, piperidine or morpholine ring together with the nitrogen atom.

Each constitutional element will be explained in detail.

CHLOROPHOPHAZENE POLYMER

The starting material, chlorophosphazene polymer represented by the formula (II) can be prepared by various common methods. For example, dichlorophosphazene polymer which is typical compound of formula (II) can be prepared by block polymerization or solution polymerization of 3PNC. However, it is preferable to use dirrectly the solution of polymer obtained by the solution polymerization of 3PNC, without isolating the polymer, because the chlorine atoms in the polymer are very active and extremely susceptible to hydrolysis.

The polymer is a mixture of linear polymers represented by the formula (II) wherein n is an integer of 20 or more. The polymer does not usually contain the polymers wherein n is less than 20. However, even if it contains such a low polymer (linear oligomer of n being less than 20, or 3PNC), the low polymer does not disturb the process of the present invention.

On the one hand, a partially substituted chlorophosphazene polymers with organic groups may be used as a starting material in the present invention. The partially substituted chlorophosphazene polymers may be prepared by the conventional methods or the process of the present invention using less amount of hydroxy compounds than the equivalent to the chlorine atoms of the dichlorophosphazene polymer. When the polymer is shown by the formula (II), one of x or y may be a mixed decimal (an integer with a decimal) and the other may be a decimal. The numbers of x and y are average number of substituent.

HYDROXY COMPOUND

The hydroxy compounds used in the present invention are shown by the formula (III).

When R is alkyl group, it is straight or branched chain alkyl having 1 to 18 carbon atoms, and it may have the following substituents: halogen, cyano, nitro, alkoxy, haloalkoxy, alkoxycarbonyl, haloalkoxycarbonyl, disubstituted amino, pyrrolidino, piperidino, morpholino, aryl, aryloxy, acid amido, acid imido, etc.

When R is alkenyl or alkinyl group, it is straight or branched and have 2 to 18 carbon atoms. The groups may have the same substituents as the ones illustrated in the case of R being alkyl.

When R is aryl, it is phenyl or naphthyl and may have the following substituents:

halogen, cyano, nitro, alkyl, alkenyl, haloalkyl, alkoxy, haloalkoxy, alkoxycarbonyl, haloalkoxycarbonyl, disubstituted amino, pyrrolidino, piperidino, morpholino, cycloalkyl, aryl, aryloxy, arylsulfonyl, acid amido, etc.

When producing organophosphazenen polymers containing two or more kinds of —OR groups, the hydroxy compounds may be used as a mixture or each hydroxy compound may be reacted separately.

Typical examples of the hydroxy compounds used in the present invention are shown below with no particular restrictions only thereto:

When R is alkyl:
methyl alcohol, ethyl alcohol, n-propyl alcohol, isopropyl alcohol, n-butyl alcohol, pentyl alcohol, octyl alcohol, decyl alcohol, dodecyl alcohol, tetradecyl alcohol, hexadecyl alcohol, octadecyl alcohol, trifluoroethyl alcohol, nonafluorohexyl alcohol, tridecafluorooctyl alcohol, heptadecafluorodecyl alcohol, heneicosafluorododecyl alcohol, pentaicosafluorotetradecyl alcohol, nonaicosafluorohexadecyl alcohol, tritriacontafluoro octadecyl alcohol, methoxyethyl alcohol, methoxyethoxyethyl alcohol, piperidinoethyl alcohol, phenoxyethyl alcohol, benzyl alcohol, phenylethyl alcohol or their isomers.

When R is alkenyl:
allyl alcohol, isopropenyl alcohol, butenyl alcohol, oleyl alcohol or phenylpropenyl alcohol.

When R is aryl:
phenol, naphthols, cresols, ethylphenols, butylphenols, octylphenols, vinylphenols, allylphenols, methoxyphenols, chlorophenols, bromophenols, nitrophenols, trifluoromethylphenols, trifluoromethoxyphenols, acetylphenols, N,N-dimethylamino phenols, acetoamidophenols, phenylphenols, phenoxyphenols or p-(p-tolylsulfonyl)phenol.

CATALYST

For the pyridine derivatives represented by the formula (V) as a catalyst in the present invention, 4-dimethylaminopyridine, 4-diethylaminopyridine, 4-pyrrolidinopyridine or 4-piperidinopyridine is preferable.

It is usually appropriate to use the catalyst in an amount from about 1/30 to about 1/20 mole based on one active chlorine atom. Although the catalyst effect can be obtained even if the amount is much more smaller than 1/30 mole, such as 1/200 mole, somewhat longer reaction time is required. Although it does not disturb the process of the present invention to use a larger amount of the catalyst than 1/20 mole, such as 1/10 mole, it is not preferable in view of industrial aspect.

ACID ACCEPTOR

The tertiary amines represented by the formula (IV) can include, for example, methyldiethylamine, triethylamine, N,N-dimethylbutylamine, N,N-diethylbutylamine, N,N-dimethyloctylamine, N,N-diethyloctylamine, N,N-dimethyldodecylamine, N,N-dimethylstearylamine, N,N-dimethylcyclohexylamine, N,N-diethylcyclohexylamine, N-methylpyrrolidine, N-methylpiperidine, or the like.

The acid acceptor is used in an equivalent amount or more to the active chlorine atoms, but the use of excess amount does not disturb the reaction and rather it may also serve as a reaction solvent.

The pyridine derivatives do not serve as a catalyst if the acid acceptor is a tertiary amine other than the compound represented by the formula (IV). For example, the catalysts are not effective when the acid acceptor is pyridine, which are shown by the comparative examples 5 and 6. The combination of the catalysts and acid acceptors are essential in the present invention.

REACTION MEDIUM

Although the present invention can be carried out without reaction solvent, it is advantageously conducted in an inert organic solvent for controlling the reaction temperature, reaction rate, etc.

The inert organic solvent is such a solvent as not to disturb the substitution reaction of chlorine atoms with hydroxy compounds. Such solvent can include, for example, aromatic solvent such as benzene, toluene, monochlorobenzene and dichlorobenzene; petroleum type solvent such as hexane, heptane, ligroin and petroleum ether; aprotic polar solvent such as dimethylformamide, acetonitrile and dimethylsulfoxide; ketone type solvent such as acetone and methyl ethyl ketone; ether type solvent such as ethyl ether, tetrahydrofuran and dioxane; ester type solvent such as ethyl formate and ethyl acetate; and chloroform, carbon tetrachloride, carbon disulfide, tetrachloroethane and dichloroethane.

In the reaction according to the present invention, the tertiary amine used as the acid acceptor may be used in excess for serving also as the inert organic solvent.

Inert organic solvents usale in the present invention are of course not restricted only to the examples described above.

The inert solvent is preferably used in such an amount as to allow to dissolve the starting materials and to smoothly stir the reaction system.

OPERATION METHOD

The present invention is carried out by the reaction of chlorophosphazene polymers with organic hydroxy compounds using an acid acceptor in the presence of a catalyst.

For the reaction, a solution of a chlorophosphazene polymer in an inert organic solvent is added, preferably dropped, into a stirred solution of hydroxy compound, acid acceptor and catalyst in an inert organic solvent.

The reaction satisfactorily proceeds generally at a temperature within an approximate range of 0° C. to 70° C., in most cases, from 10° C. to about 30° C., while it varies depending on the kind of the solvent used, the amount of the catalyst used, the reactivity of the starting material to be used, etc.

The reaction is generally completed in about 1 hour to about 24 hours, while it also varies depending on the reaction temperature and other factors described above.

The completion of the reaction can be checked by a pyridine-aniline mixture reagent. That is, a droplet of the reaction solution is placed on a filter paper or on a plate for thin layer chromatography, and after evaporating the solvent, a mixed solution of pyridine and aniline by 1:1 weight ratio is sprayed on it. If active chlorine atoms are present in the specimen, the spot of the specimen directly develops red color, and the color appears deeper as the amount of active chlorine atoms is greater.

After the completion of the reaction, the produced organophosphazene polymer is filtered off together with the hydrochloride of the acid acceptor which is insoluble to organic solvents, when the produced organophosphazene polymer is insoluble to the organic solvent used. The filter cake is washed with water to remove most of the hydrochloride of the acid acceptor to obtain crude product. Then, it is dissolved in such a solvent as tetrahydrofuran or acetone which the product can dissolve in and is miscible with water. The addition of the solution into water gives the precipitation of the aimed polymer. The precipitate is filtered off and washed with water. Preferably after repeating the purification it is dried to obtain the purified organophosphazene polymer.

On the other hand, when the aimed product is soluble in the used solvent, the precipitate of the hydrochloride of acid acceptor is filtered off after the reaction. The filtrate is added into such a solvent as methanol which the product is insoluble in and the reaction solvent and the tertiary amines are miscible with. The precipitation of the organophosphazene polymer is dried and dissolved in a solvent. The solution is added into such a solvent as methanol to make the precipitation of product. The precipitate is purified by dissolving in such a solvent as tetrahydrofuran and acetone and adding the solution into water. This purification treatment may be repeated two or three times, and then the precipitate is dried to obtain the purified organophosphazene polymer.

EXAMPLE

To further illustrate this invention, and not by way of limitation, the following examples are given.

PREPARATION OF DICHLOROPHOSPHAZENE POLYMER

In a 200 ml flask, 50 g of 3PNC, 0.0929 g of sulfuric acid and 1,2,4, trichlorobenzene were placed. The mixture was allowed to react for 3 hours under reflux in an atmosphere of nitrogen. The reaction mixture turned into a highly viscous liquid. The reaction mixture was added into 200 ml of n heptane after cooling at 120° C. to obtain the precipitation of dichlorophosphazene polymer as gummy material. The product was separated and dissolved in 100 ml of toluene. The resulting solution including 30 g of dichlorophosphazene polymer (—[N=PCl$_2$]n when showed by formula (II)) in 100 ml of toluene was used as the starting material for the production of organophosphazene polymers.

In each following examples, above said operation was repeated and dichlorophosphazene polymer being n(average number)-1,000~2,000 was obtained.

Since the dichlorophosphazene polymer is easily hydrolized with moisture in the air, it is impossible to directly analyze the content of the polymer in the solution. Therefore, unreacted 3PNC was analyzed to determine the content of polymer.

Anhydrous organic solvents were used in this prepatation and the following Examples by drying with calcium hydride.

EXAMPLE 1

A solution of dichlorophosphazene polymer (30 g) in toluene was added dropwise over one hour to a mixture of 78.4 g of triethylamine (0.776 mole), 48.6 g of phenol (0.517 mole) and 3.16 g of 4-dimethylaminopyridine (0.026 mole). After the mixture was stirred at 25° C. for 6 hours under cooling with water, any active chlorine atoms were not detected with the pyridine-aniline reagent.

After further stirring for one hour, precipitated organophosphazene polymer was filtered off together with hydrochloride of triethyl amine, washed with water and dissolved in 100 ml of tetrahydro-furan (herinafter referred to as "THF"). Addition of the solution into 300 ml of water yielded precipitation of fibrous material. The precipitate was dissolved in 300 ml of THF again and the solution was added into 300 ml of methanol to precipitate purified product as white fibrous material. Drying of the precipitate under reduced pressure gave 53.8 g of purified organo-phosphazene polymer. The results of gel permeation chromatography and IR analysis of the product showed that the product was a mixture of poly[bis(phenoxy)phosphazene:–[N=P(OPh)$_2$]n] having a weight average molecular weight (hereinafter referred to as "MW") of 358,200, and the amount of active chlorine atoms remaining therein was 0.01 wt% or less.

EXAMPLE 2

Alternation of Catalyst

The same experiment as in Example 1 was carried out except for using 3.84 g of 4-pyrrolidinopyridine (0.026 mole) instead of 4-dimethylaminopyridine to obtain 52.1 g of white fibrous material. The product was a mixture of poly[bis(phenoxy)phosphazene] having a MW of 345,300, and the amount of active chlorine atoms remaining therein was 0.01 wt% or less.

EXAMPLE 3

Alternation of Catalyst

The same experiment as in Example 1 was carried out except for using 4.20 g of 4-piperidinopyridine (0.026 mole) instead of 4-dimethylaminopyridine to obtain 48.9 g of white fibrous material. The product was a mixture of poly[bis(phenoxy)phosphazene] having a MW of 332,200, and the amount of active chlorine atoms remaining therein was 0.01 wt% or less.

EXAMPLE 4

Alternation of the Amount of Catalyst

The same experiment as in Example 1 was carried out at 50° C. for 12 hours using 0.316 g of 4-dimethylaminopyridine (0.0026 mol) as a catalyst to obtain 50.9 g of white fibrous material. The product was a mixture of poly[bis(phenoxy)phosphazene] having a MW of 328,900, and the amount of active chlorine atoms remaining therein was 0.01 wt% or less.

EXAMPLES 5-7

Alternation of Acid Acceptor

The same experiments as in Example 1 were carried out using 98.7 g of N,N-dimethylcyclohexylamine (0.776 mole), 66.0 g of N-methylpyrrolidine (0.766 mole) and 76.8 g of N-methylpiperidine (0.776 mole) respectively instead of triethylamine.

The amount of active chlorine atoms remaining therein was 0.01 wt% or less in any cases.

The results were shown in Table 1.

TABLE 1

| Example No. | Acid Acceptor | Product Appearance | Yield | MW |
| --- | --- | --- | --- | --- |
| 5 | *a | white fibrous material | 50.1 g | 308,900 |
| 6 | *b | " | 50.5 g | 329,800 |
| 7 | *c | pale yellow fibrous material | 51.9 g | 368,300 |

*a: N,N—dimethylcyclohexylamine
*b: N—methylpyrrolidine
*c: N—methylpiperidine

EXAMPLES 8-22

Alternation of Hydroxy Compound

The same experiments as in Example 1 were carried out except for using the other hydroxy compounds shown in Table 2 instead of phenol to obtain various organophosphazene polymers.

The amount of active chlorine atoms remaining therein was 0.01 wt% or less in any cases.

The results were shown in Table 3.

TABLE 2

| Example No. | Hydroxy Compound |
| --- | --- |
| 8 | m-cresol |
| 9 | p-chlorophenol |
| 10 | p-cyanophenol |
| 11 | p-methoxyphenol |
| 12 | p-phenylphenol |
| 13 | p-tert-octylphenol |
| 14 | m-(dimethylamino)phenol |
| 15 | p-(tolylsulfonyl)phenol |
| 16 | n-propyl alcohol |
| 17 | lauryl alcohol |
| 18 | allyl alcohol |
| 19 | 2-(2-methoxyethoxy)ethanol |
| 20 | 2,2,2-trifluoroethyl alcohol |
| 21 | heptadecafluorodecyl alcohol |
| 22 | mixture of phenol(44.5),o-allylphenol (45.5) and p-sec-butylphenol(10.0) in weight ratio |

TABLE 3

| Example No. | Product Appearance | Yield (g) | MW |
| --- | --- | --- | --- |
| 8 | white fibrous material | 59.7 | 402,430 |
| 9 | " | 70.2 | 467,150 |
| 10 | " | 65.5 | 425,000 |
| 11 | " | 67.2 | 405,250 |
| 12 | white powder | 90.2 | 478,200 |
| 13 | pale yellow powder | 102.9 | 659,900 |
| 14 | " | 74.3 | 465,100 |
| 15 | pale yellow fibrous material | 121.4 | 793,200 |
| 16 | white fibrous material | 38.8 | 252,630 |
| 17 | pale yellow solid | 86.0 | 658,100 |
| 18 | pale yellow fibrous material | 36.2 | 244,750 |
| 19 | dark brown tarry material | 39.3 | 238,500 |
| 20 | white fibrous material | 57.3 | 259,500 |
| 21 | white powder | 205.9 | *a |
| 22 | brown rubbery material | 102.0 | 702,900 |

*a: The product in Example 21 was insoluble in THF for GPC analysis and the measurement of molecular weight was impossible.

EXAMPLE 23

Alternation of Acid Acceptor and Reaction Conditions

A solution of dichlorophosphazene polymer (30 g) in toluene was added dropwise over 30 minutes to a solution of 230.8 g of N,N-dimethylstearylamine (0.776 mole), 48.6 g of phenol (0.517 mole) and 3.16 g of 4-dimethylaminopyridine (0.026 mole) in 100 ml of toluene. The mixture was stirred at 50° C. for 15 hours under cooling with water. The reaction mixture was treated as in Example 1 to obtain 49.9 g of white fibrous product. The analytical results showed that the product was a mixture of poly[bis(phenoxy)phosphazene] having a MW of 392,500, and the amount of active chlorine atoms remaining therein was 0.01 wt% or less.

EXAMPLE 24

The same experiment as in Example 23 was carried out except for using 67.5 g of N,N-dimethyl n-propylamine (0.776 mole) instead of N,N-dimethylstearylamine and the same results were obtained as in Example 23. The MW of the product was 342,700.

COMPARATIVE EXAMPLE 1

Reaction was carried out in the same manner as in Example 1 for 7 hours except for not using 4-dimethylaminopyridine. Then, the analysis for detecting active chlorine atoms was conducted by the pyridine-aniline mixture reagent and it showed a deep red color indicating that a great amount of active chlorine atoms remained. After further continuing the reaction for 41 hours, no substantial change was shown in the density of red color.

COMPARATIVE EXAMPLE 2

Experiment was carried out in the same manner as in Comparative Example 1 except for using n-propyl alcohol (as in Example 16) instead of phenol, and the same results as in Comparative Example 1 were obtained.

COMPARATIVE EXAMPLE 3

Experiment was carried out in the same manner as in Example 23 except for not using the catalyst, 4-dimethylaminopyridine. As a result, remaining active chlorine atoms were detected even after the reaction for 48 hours.

COMPARATIVE EXAMPLE 4

Experiment was carried out in the same manner as in Example 24 except for not using the catalyst, 4-dimethylaminopyridine. As a result, remaining active chlorine atoms were detected even after the reaction for 48 hours.

COMPARATIVE EXAMPLE 5

Reaction was carried out in the same manner as in Example 2 at 25° C. for 7 hours except for using 61.4 g of pyridine (0.776 mole) as an acid acceptor instead of triethylamine. Then, remaining active chlorine atoms were analyzed by the pyridine-aniline mixture reagent and it showed a deep red color indicating that a great amount of active chlorine atoms remained. After further continuing the reaction at 50° C. for 41 hours, no substantial change was shown in the density of red color.

COMPARATIVE EXAMPLE 6

Experiment was carried out in the same manner as in Comparative Example 5 except for using n-propyl alcohol (as in Example 16) instead of phenol, and the same results as in Comparative Example 5 were obtained.

What is claimed is:

1. A process for producing an organophosphazene polymer represented by the formula (I)

$$-[N=P(OR)_2]_n \qquad (I)$$

wherein R is the same or different group selected from the group consisting of alkyl, alkenyl, alkinyl and aryl group or said group having a substituent and n is an integer of 20 or more, which comprises reacting a chlorophosphazene polymer represented by the formula (II)

$$-[N=PCl_x(OR)_y]_n \qquad (II)$$

wherein n is an integer of 20 or more, $x+y=2$ and R is the same as defined above, with at least one kind of hydroxy compound represented by the formula (III)

$$HO-R \qquad (III)$$

wherein R is the same as defined above, in the presence of a tertiary amine represented by the formula (IV) as an acid acceptor

$$X^2-N-X^1 \atop | \atop X^3 \qquad (IV)$$

wherein $X^1$ represents alkyl, cycloalkyl or aralkyl, $X^2$ and $X^3$ represent identical or different lower alkyl or constitute pyrrolidine, piperidine or morpholine ring together with the nitrogen atom, and in the presence of a pyridine derivative represented by the formula (V) as a catalyst

wherein $Q^1$ and $Q^2$ represent identical or different lower alkyl groups or constitute a pyrrolidine, piperidine or morpholine ring together with the nitrogen atom to substitute substantially all the chlorine atoms with the —OR groups.

2. The process according to claim 1, wherein a chlorophosphazene polymer represented by the formula (II) is dichlorophosphazene polymer, the catalyst represented by the formula (V) is 4-dimethylaminopyridine, 4-diethylaminopyridine, 4-pyrrolidinopyridine or 4-piperidinopyridine.

3. The process according to claim 2, wherein the amount of catalyst is more than 1/30 mole based on one active chlorine atom.

4. The process according to claim 1, wherein $X^1$ is alkyl or cycloalkyl in the formula (IV) representing the acid acceptor.

5. The process according to claim 1, wherein the reaction is carried out in an inert organic solvent.

6. The process according to claim 1, wherein the reaction is carried out at a temperature from 0° C. to 70° C.

7. The process according to claim 6, wherein the reaction is carried out for 1 to 12 hours.

* * * * *